(12) United States Patent
Mehlis et al.

(10) Patent No.: US 10,513,171 B2
(45) Date of Patent: Dec. 24, 2019

(54) DRIVE ARRANGEMENT FOR A VEHICLE, AND VEHICLE HAVING THE DRIVE ARRANGEMENT

(71) Applicant: Schaeffler Technologies AG & Co. KG, Herzogenaurach (DE)

(72) Inventors: Thomas Mehlis, Kleinsendelbach (DE); Andreas Kinigadner, Erlangen (DE); Robert Hayes, Heroldsberg (DE); Alexander Reimchen, Herzogenaurach (DE); Hartmut Mende, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 505 days.

(21) Appl. No.: 15/128,362

(22) PCT Filed: Feb. 27, 2015

(86) PCT No.: PCT/DE2015/200108
§ 371 (c)(1),
(2) Date: Sep. 22, 2016

(87) PCT Pub. No.: WO2015/149762
PCT Pub. Date: Oct. 8, 2015

(65) Prior Publication Data
US 2017/0100999 A1    Apr. 13, 2017

(30) Foreign Application Priority Data

Apr. 2, 2014  (DE) .................. 10 2014 206 229

(51) Int. Cl.
*B60K 6/38*    (2007.10)
*B60K 6/383*   (2007.10)
(Continued)

(52) U.S. Cl.
CPC ................ *B60K 6/383* (2013.01); *B60K 6/36* (2013.01); *B60K 6/48* (2013.01); *B60K 17/26* (2013.01);
(Continued)

(58) Field of Classification Search
CPC .......... B60K 6/36; B60K 6/383; B60K 17/26; B60K 6/48; F16H 3/10
(Continued)

(56) References Cited

U.S. PATENT DOCUMENTS 1,935,459 A * 11/1933 Ryan .................... F16D 13/686
                                                         192/209
5,931,271 A *  8/1999 Haka ........................ B60K 6/26
                                                         180/65.25
(Continued)

FOREIGN PATENT DOCUMENTS

CN    1061470 A    5/1992
DE    3840484      6/1990
(Continued)

OTHER PUBLICATIONS

Hifang: "Research on Parameter Matching and Control Strategy of Hybrid Energy Storage System for HEV," Dissertation for the Doctoral Degree in Engineering, China Academic Journal Electronic Publishing Hours, date of Defence, Sep. 2010.
(Continued)

*Primary Examiner* — William C Joyce
(74) *Attorney, Agent, or Firm* — Davidson, Davidson & Kappel, LLC

(57) ABSTRACT

A drive arrangement and a vehicle having a damper device having a damper primary side and a damper secondary side. The damper primary side forms a first drive interface for the coupling of a crankshaft of an internal combustion engine, having a freewheel device with a freewheel input and a
(Continued)

freewheel output. The damper secondary side is coupled rotationally conjointly to the freewheel input, having a gearbox section operatively connected to the freewheel output, having an output interface for the coupling of a drive output section of the vehicle, wherein the output interface is operatively connected to the gearbox section, and having a second drive interface for the coupling of the electric motor and operatively connected to the gearbox section by a control device. The drive arrangement can, by the control device, be switched into different operating states such that a drive torque can be transmitted to the output interface by the first drive interface or by the second drive interface.

9 Claims, 2 Drawing Sheets

(51) Int. Cl.
| | | |
|---|---|---|
| B60K 6/48 | (2007.10) | |
| B60K 17/26 | (2006.01) | |
| B60W 10/06 | (2006.01) | |
| B60W 10/08 | (2006.01) | |
| F16D 3/12 | (2006.01) | |
| F16D 41/066 | (2006.01) | |
| F16D 47/02 | (2006.01) | |
| B60W 20/40 | (2016.01) | |
| B60K 6/36 | (2007.10) | |
| F16D 41/064 | (2006.01) | |
| B60W 10/11 | (2012.01) | |
| B60W 20/00 | (2016.01) | |

(52) U.S. Cl.
CPC .......... *B60W 10/06* (2013.01); *B60W 10/08* (2013.01); *B60W 10/11* (2013.01); *B60W 20/40* (2013.01); *F16D 3/12* (2013.01); *F16D 41/064* (2013.01); *F16D 41/066* (2013.01); *F16D 47/02* (2013.01); *B60K 2006/4816* (2013.01); *B60K 2006/4833* (2013.01); *B60W 20/00* (2013.01); *B60Y 2200/92* (2013.01); *B60Y 2400/48* (2013.01); *F16D 2300/22* (2013.01); *Y02T 10/6221* (2013.01); *Y02T 10/6256* (2013.01); *Y02T 10/6286* (2013.01)

(58) Field of Classification Search
USPC .............. 180/65.7; 74/665 A, 665 B; 192/46
See application file for complete search history.

(56) References Cited

U.S. PATENT DOCUMENTS

| | | | | |
|---|---|---|---|---|
| 6,575,275 | B2* | 6/2003 | Muramatsu | F16D 41/12 192/212 |
| 8,417,427 | B2* | 4/2013 | Stridsberg | B60K 6/387 701/51 |
| 2001/0022245 | A1* | 9/2001 | Rogg | B60K 6/365 180/65.21 |
| 2010/0314185 | A1 | 12/2010 | Schoenek | |
| 2011/0239819 | A1* | 10/2011 | Shibahata | B60K 6/383 74/665 A |

FOREIGN PATENT DOCUMENTS

| | | |
|---|---|---|
| DE | 102007043737 | 3/2009 |
| DE | 102008008005 | 8/2009 |
| DE | 102009002805 | 11/2010 |
| DE | 102011100754 | 3/2012 |
| JP | 2002172944 | 6/2002 |
| WO | WO2004/053350 | 6/2004 |
| WO | WO2009098020 | 8/2009 |

OTHER PUBLICATIONS

International Search Report of PCT/DE2015/200108 dated Jun. 23, 2015, 2 pages.

* cited by examiner

DRIVE ARRANGEMENT FOR A VEHICLE, AND VEHICLE HAVING THE DRIVE ARRANGEMENT

SUMMARY OF THE INVENTION

It is an object of the present invention to provide a drive system for a vehicle, which represents a refinement of the known prior art.

Within the scope of the present invention, a drive system is provided, which is suitable and/or designed for a vehicle. The vehicle is implemented, in particular, as a passenger car, a truck, a bus or the like. The drive system is used to provide a driving torque for the vehicle, the drive system particularly preferably handling the exclusive driving of the vehicle. In particular, the drive system is designed to accelerate the vehicle to a speed of more than 50 kilometers per hour.

The drive system—also referred to as a power train—includes a damper device, the damper device having a damper primary side and a damper secondary side. A damper section is situated between the damper primary side and the damper secondary side. The damper primary side forms a first drive interface and is designed for coupling a crankshaft of an internal combustion engine. The internal combustion engine optionally forms one part of the drive system, the crankshaft then being rotatably fixedly connected to the first drive interface, in particular rotatably fixedly mounted in the first drive interface. The damper device operates in the circumferential direction, so that rotational speed changes, oscillations and/or vibrations are transmitted between the damper primary side and the damper secondary side only in a damped manner. In particular, the damper primary side and the damper secondary side are pivotably situated with respect to each other in the circumferential direction, the pivoting motion being designed as a damped pivoting motion.

The drive system also includes a freewheel device, the freewheel device having a freewheel input and a freewheel output. The damper secondary side is rotatably fixedly coupled with the freewheel input. In particular, the freewheel device is designed so that a rotational movement may be transmitted from the freewheel input to the freewheel output in a first rotation direction and freewheels in an opposite rotation direction.

The drive system furthermore includes a transmission section, the transmission section being operatively connected to the freewheel output. The freewheel output thus forms an input to the transmission section.

The drive system also includes an output interface for coupling an output section of the vehicle. The output section may include, for example, a differential device, in particular a longitudinal and/or transverse differential device. In particular, the output section may include driven wheels of the vehicle. The output interface is operatively connected to the transmission section and/or forms an output from the transmission section.

Within the scope of the present invention, it is provided that the drive system includes a second drive interface for coupling an electric motor. The electric motor particularly preferably forms one part of the drive system. The second drive interface is operatively connected to the transmission section, so that a driving torque may be conducted from the electric motor to the transmission section via the second drive interface. The electric motor is dimensioned to drive the vehicle in exclusive operation, i.e., in particular without support from the internal combustion engine.

The drive system furthermore includes a control device. The control device may be designed as a separate control device but may also be represented and implemented by a main control device of the vehicle. It is also possible to divide the control device into different physically separate and/or logically separate control modules, some of the control modules, in particular, being able to be situated in arbitrary control devices.

The control device is provided with a programmable and/or switchable design for switching the drive system into different operating states. As a function of the switched operating state, a driving torque is conducted from the first drive interface to the output interface, so that a pure internal combustion engine drive is present, a driving torque is conducted from the second drive interface to the output interface, so that a pure electromotive drive is present, and a driving torque is conducted from the first drive interface and simultaneously from the second drive interface to the output interface, so that a hybrid drive is present. In particular, the drive system is switchable to another operating state in such a way that the electric motor is used as a generator in a coasting mode.

The present invention is based on the idea that, upon superimposing the driving torque from the first and the second drive interfaces, i.e., a superimposition of the driving torques from the internal combustion engine and the electric motor, rotational speed differences and/or rotational speed fluctuations may occur as disturbances during synchronization, which may impair the synchronization in the transmission section. These disturbances may be effectively compensated for by the damper device. In particular, the damper device may be used to damp an initial jolt during the coupling of the internal combustion engine via the freewheel device.

The provided combination of the damper device, the freewheel device and the transmission section makes it possible to superimpose the driving torque of the internal combustion engine onto the driving torque of the electric motor during the transition from a purely electromotive drive to a hybrid drive or a purely internal combustion engine drive. The internal combustion engine may thus adjust its rotational speed to the instantaneous rotational speed of the transmission section, which is determined by the electric motor, with the aid of the freewheel device, an initial jolt being damped by the damper device at the adjustment point, i.e., starting at the moment from which a driving torque runs from the internal combustion engine to the output interface.

It is particularly preferred to design the freewheel device as an overrunning clutch. In the overrunning clutch, the connection between the freewheel input and the freewheel output is automatically interrupted as soon as the freewheel output is rotated faster than the freewheel input. Once the rotational speed of the freewheel input is greater than/equal to the rotational speed of the freewheel output, the overrunning clutch is switched to be rotatably fixed.

Projected onto the drive system according to the present invention, this design means that the freewheel output is initially rotated by the driving torque of the electric motor, the freewheel input rotating at a lower rotational speed. During a transition from the purely electromotive drive to a hybrid drive or to an internal combustion engine drive, the rotational speed of the internal combustion engine is initially lower, so that the rotational speed of the freewheel input is lower than the rotational speed of the freewheel output. During a startup of the internal combustion engine, its rotational speed increases, so that the rotational speeds of the freewheel input and the freewheel output are initially the same, and the rotational speed of the freewheel input is subsequently higher than/equal to the rotational speed of the freewheel output, so that the driving torque from the internal combustion engine is coupled into the transmission section via the freewheel device.

In one preferred implementation of the present invention, the damper device is designed as a bow spring damper device, as a torsional damper device or as a damper device having a material damper disk. In the bow spring damper device, the damper primary side and the damper secondary side are supported with respect to each other on two bow springs. In a torsional damper device, torsion springs are situated between the damper primary side and the damper secondary side. In the latter option, a damping material is situated between the damper primary side and the damper secondary side, which handles the damping transmission of the rotational movement.

In one preferred refinement of the present invention, the freewheel device is designed as a clamping body freewheel device, the latter having an inner ring component, an outer ring component and a plurality of clamping bodies, the clamping bodies being situated between the ring components. The clamping bodies may be designed as clamping rolls, clamping balls or clamping bodies of another shape. In particular, at least one of the ring components includes a clamping ramp running in the circumferential direction.

In one preferred, structural implementation of the present invention, the damper device and the freewheel device are designed as a shared built-in module. The built-in module thus includes only the first drive interface and the freewheel output as mechanical interfaces. Both a weight and installation space for the drive system as well as installation complexity may be reduced by integrating the functions of damping and freewheeling into a shared built-in module.

In one preferred refinement of the present invention, one of the ring components is mounted on the damper secondary side. In particular, the ring component extends from the clamping bodies to the damper secondary side. In particular, the ring component and the damper secondary side are connected to each other without an intermediate shaft. This preferred implementation permits a very compact construction of the built-in module and thus the drive system.

It is particularly preferred that the ring component which is mounted on the damper secondary side is designed as an inner ring component. In this embodiment, the side of this inner ring component facing the freewheel device has a smaller diameter than the side facing the damper secondary side. The ring component may be very cost-effectively manufactured, for example, as a formed part.

In one preferred embodiment of the present invention, the control device is designed to activate a transition from a first operating state to a second operating state. In the first operating state, only a driving torque from the second drive interface is present at the output interface, so that the vehicle and/or the drive system is in a purely electromotive operation. In the second operating state, only a driving torque from the first drive interface is present at the output interface, so that a purely internal combustion engine drive is present.

In the preferred embodiment, the control device is designed to activate the internal combustion engine and the electric motor in such a way that, during the transition, the freewheel device is transferred from a freewheel mode to a coupled mode by increasing the input rotational speed on the part of the internal combustion engine at the damper device. The first operating state may be designed, for example, as an electrical startup from a standstill, a switch to the second operating state taking place after the startup for the purpose of subsequently operating the vehicle in internal combustion engine mode. Alternatively, the vehicle may already have a higher speed in the first operating state, e.g. more than 30 km/h.

In one preferred refinement of the present invention, the drive system, in particular the transmission section, is switched in such a way that the freewheel output is connected to the output interface via a form-fitting geared path during the transition from the first to the second operating state. It is possible, in principle, that one or multiple coupling devices are provided on the geared path. However, all coupling devices are designed in such a way that they implement a non-powershift-capable coupling and/or a form-fitting coupling.

In particular, the inventive drive system in this refinement makes it possible to completely dispense with a classic friction clutch. The startup of the vehicle may be implemented electromotively in the first operating mode, so that no friction clutch is required therefor. During a changeover from the electromotive drive to the internal combustion engine drive, there is also no need for a friction clutch, due to the combination of the freewheel device and the damper device, since the freewheel device, together with the damper device, ensures that the driving torque of the internal combustion engine may be smoothly coupled into the transmission section.

The drive system is thus designed to require less maintenance than a classic transmission having a clutch of this type, due to the lack of the friction clutch.

In one preferred structural embodiment of the present invention, the transmission section includes an input shaft and an output shaft situated in parallel thereto, the input shaft and the output shaft being selectively operatively connectable and/or operatively connected via a first gear stage and via at least one second and a possible third, fourth, etc. gear stage. The input shaft is preferably rotatably fixedly connected to the freewheel output. The second drive interface is operatively connectable or operatively connected to one of the gear stages. The drive system thus makes it possible to transfer the driving torque to the output shaft via the second drive interface and the gear stage coupled thereto. The output shaft is rotatably fixedly coupled with the output interface. The driving torque of the first drive interface may be conducted onto the output shaft either via the same gear stage or another gear stage, a gentle coupling of the driving torque being possible, due to the combination of the damper device and the freewheel device.

Another subject matter of the present invention relates to a vehicle which includes the drive system as described above. Another subject matter of the present invention relates to a method for changing the operating state of the drive system as described above.

BRIEF DESCRIPTION OF THE DRAWINGS

Further features, advantages, and effects of the present invention result from the following description of a preferred exemplary embodiment of the present invention as well as the appended figures.

DETAILED DESCRIPTION

Figure 1:
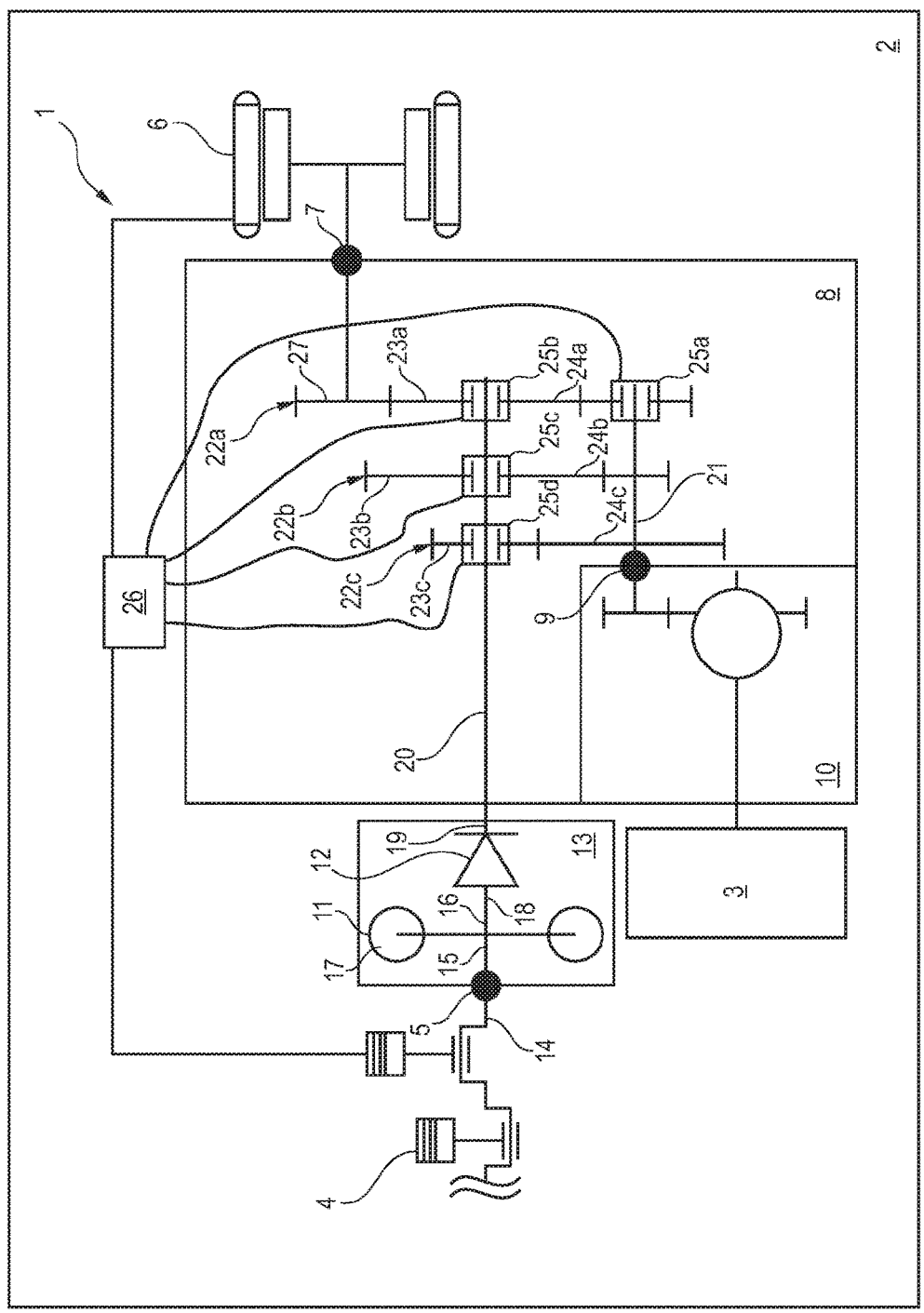
FIG. 1 shows a schematic block diagram of a drive system as one exemplary embodiment of the present invention.

FIG. 1 shows a highly schematic representation of a drive system 1 for a vehicle 2, which is illustrated only as a schematic block. Drive system 1 is used to generate and to output a driving torque for vehicle 2. Vehicle 2 includes driven wheels 3, only one wheel being illustrated in a highly schematic manner in the present case.

Drive system 1 includes an internal combustion engine 4 or is coupled therewith, internal combustion engine 4 being able to provide a driving torque via a first drive interface 5. Drive system 1 furthermore includes an electric motor 6, which is able to provide a driving torque via a second drive interface 7. First drive interface 5 and second drive interface 7 are directly or indirectly coupled with a transmission section 8, which—from a functional point of view—performs the task of conducting the driving torques from internal combustion engine 4 and/or electric motor 6 into an output area 10 via an output interface 9, output area 10 being operatively connected to driven wheels 3. In FIG. 1, for example, a driving torque is transmitted from output interface 9 to a differential device, which distributes it to two driven wheels 3 of vehicle 2.

A damper device 11 as well as a freewheel device 12 are situated between internal combustion engine 4 and transmission section 8. Damper device 11 and freewheel device 12 may be designed as a shared built-in module 13. Damper device 11 has a damper primary side 15, which forms first input interface 5 and which is rotatably fixedly coupled with a crankshaft 14 of internal combustion engine 4. Damper device 11 also has a damper secondary side 16, a damper section 17 being situated between damper primary side 15 and damper secondary side 16. Damper section 17 permits a limited and at the same time damped relative movement in the circumferential direction around crankshaft 14 from damper primary side 15 and damper secondary side 16. Oscillations or vibrations of internal combustion engine 4 active in the circumferential direction are thus damped by damper device 11.

Freewheel device 12 includes a freewheel input 18 and a freewheel output 19. Freewheel input 18 is rotatably fixedly coupled with damper secondary side 16. Freewheel output 19 is operatively connected to transmission section 8 and forms an input thereto. Freewheel device 12 is designed as an overrunning clutch, it being provided, in relation to a rotation direction, that a rotation is transferred from damper secondary side 16 to freewheel output 19 when the angular velocity is greater than the instantaneous angular velocity of freewheel output 19. In the case that the angular velocity of freewheel output 19 is greater than that of freewheel input 18 and/or damper secondary side 16, freewheel device 12 is in a freewheeling state, and the rotational movements are decoupled from each other. Freewheel device 12 is designed, in particular, as a clamping body freewheel device.

In another specific embodiment, which is not illustrated here, a connecting interface between damper secondary side 16 and freewheel input 18 is structurally designed as an offset compensating element in such a way that a possible radial and/or axial clearance occurring during assembly may be compensated for. Torque and rotational speed may thus be transmitted via this interface, despite an axis offset and/or lack of axis parallelism of the axis of the damper secondary side and the axis of the freewheel input. This connecting interface is preferably structurally integrated into shared built-in module 13.

In another preferred specific embodiment, the connecting interface between damper secondary side 16 and freewheel input 18 may be structurally designed as an offset compensating element in such a way that an axis offset and/or lack of axis parallelism between the crankshaft and the freewheel input may be compensated for.

Transmission section 8 includes an input shaft 20 and an output shaft 21 situated in parallel thereto. Input shaft 20 is rotatably fixedly coupled with freewheel output 19. In this example, input shaft 20 and output shaft 21 are coupled via three gear stages 22a, b, c. In other exemplary embodiments, there may be two gear stages or more gear stages.

First gear stage 22a includes a drive wheel 23a, which is situated as an idler wheel coaxially to input shaft 20. First gear stage 22a furthermore includes an output wheel 24a, which is situated as an idler wheel coaxially on output shaft 21. Second gear stage 22b includes a drive wheel 23b, which is situated as an idler wheel coaxially on input shaft 20. Second gear stage 22b furthermore includes an output wheel 24b, which is situated as a fixed wheel on output shaft 21. Third gear stage 22c includes a drive wheel 23c, which is situated as an idler wheel on input shaft 20, as well as an output wheel 24c, which is situated as a fixed wheel on output shaft 21. Second drive interface 7 is rotatably fixedly coupled with an electric motor drive wheel 27, which meshes with first drive wheel 23a of first gear stage 22a.

Gear stages 22a, b, c each convert a different gear ratio. Drive wheels 23a, b, c designed as idler wheels and output wheel 24a designed as an idler wheel may each be rotatably fixedly coupled with the particular assigned shaft, i.e. input shaft 20 or output shaft 21, via a coupling device 25a, b, c, d.

Coupling devices 25a, b, c, d are form-fitting coupling devices, idler wheels 23a, b, c, 24a being connected in a form-fitting manner to particular shafts 20 or 21 in the circumferential direction in the coupled state. In particular, transmission section 8 or entire drive system 1 does not include a friction clutch which establishes a coupling exclusively on the basis of a frictional engagement.

Drive system 1 includes a control device 26, which is designed to activate internal combustion engine 4, electric motor 6 as well as coupling devices 25a, b, c, d. Control device 26 may also have a decentralized design including multiple individual modules and be partially implemented by a main control device of vehicle 2.

Due to the illustrated transmission architecture of drive system 1, the use of friction clutches may be completely dispensed with for a changeover of drive system 1 by control device 26 from an electromotive drive to an internal combustion engine drive.

For example, if one contemplates the startup of vehicle 2, the latter is implemented electromotively, since the friction clutch may be dispensed with during electromotive startup. For a startup, control device 26 switches coupling device 25a to the coupled state, so that, starting from electric motor 6, a driving torque may be transmitted to output interface 9 and thus to output area 10 via second input interface 7, electric motor input wheel 27, drive wheel 23a, output wheel 24a, first coupling device 25a, and output shaft 21.

For example, if a changeover from the first operating state to a second operating state is to take place for faster travel, the driving torque being provided by internal combustion engine 4, the transition is controlled as follows:

Freewheel output 19 is brought into a form-fitting gear connection with output interface 9. For this purpose, it is possible that coupling device 25c or 25d is closed. If one initially contemplates an operation of internal combustion engine 4 at idling speed, freewheel input 18 rotates more slowly than freewheel output 19, since the latter is only dragged along with output interface 9 via the form-fitting gear connection. If the rotational speed of internal combustion engine 4 is slowly increased, the rotational speed of freewheel input 18 will adapt to and reach the rotational speed of freewheel output 19. Starting at the same rotational speed, freewheel input 18 is rotatably fixedly coupled with freewheel output 19 via freewheel device 12, so that a driving torque is transmitted from internal combustion engine 4 to output shaft 21 via input shaft 20. In this state, the electric motor may be decoupled at a synchronized speed by opening coupling device 25a.

To prevent a startup jolt during the coupling in of internal combustion engine 4, damper device 11 is connected therebetween. A startup of vehicle 2 and a switch to an operating mode having an internal combustion engine drive may thus take place without a friction clutch.

However, a transition from an electromotive drive to an internal combustion engine drive may be advantageously implemented in the same way and without jolting even at higher travel speeds.

Figure 2:
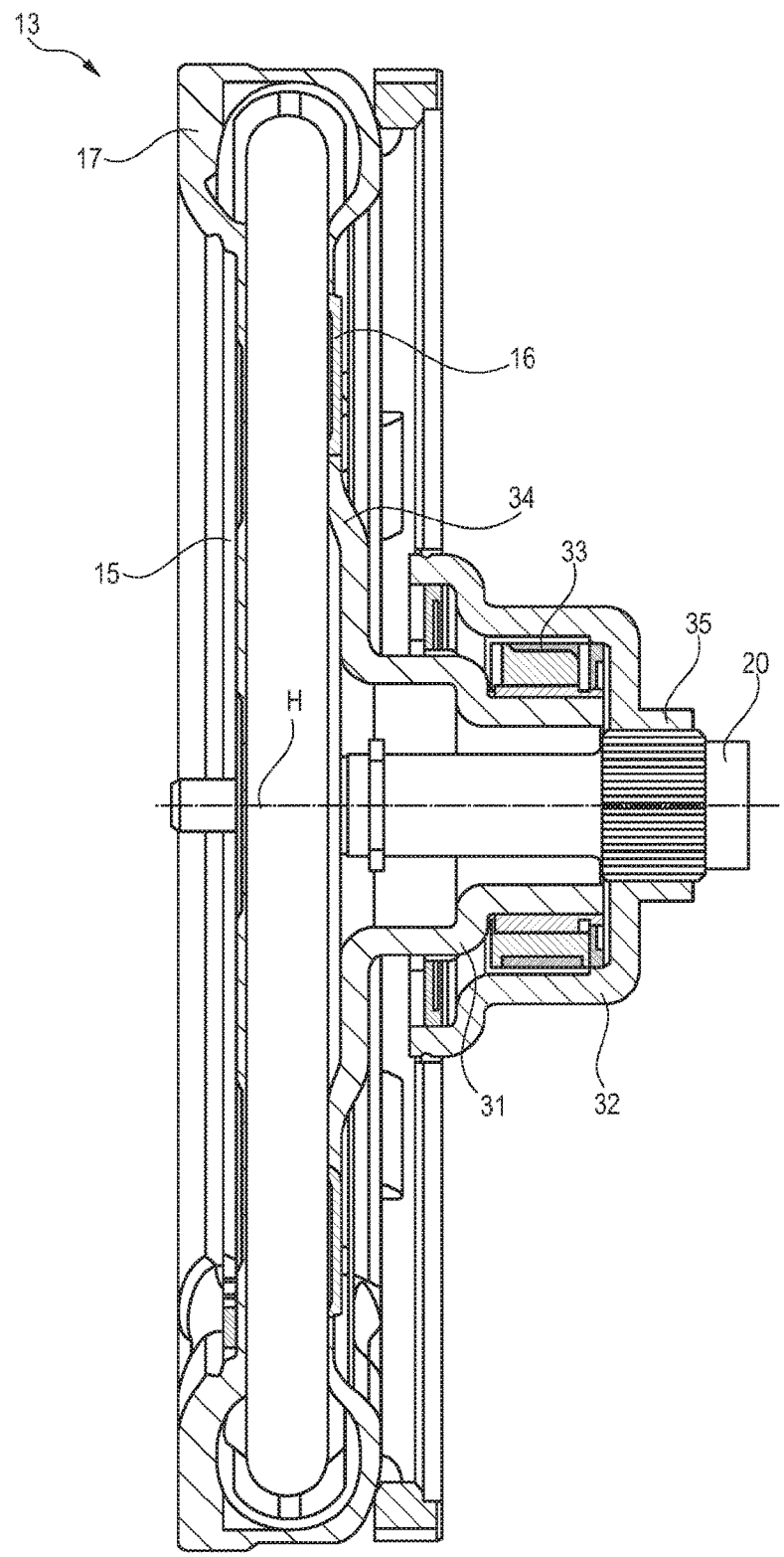
FIG. 2 shows a schematic longitudinal section of a built-in module in the drive system in FIG. 1.

FIG. 2 shows a schematic longitudinal sectional view of built-in module 13, including damper device 11 and freewheel device 12. Damper device 11 has damper primary side 15, which is coupled with crankshaft 14. Damper device 11 furthermore has damper secondary side 16, damper section 17 being situated between damper primary side 15 and damper secondary side 16, which permits a relative rotation around rotation axis H from damper primary side 15 to damper secondary side 16 in a damped manner. For example, damper section 17 is designed as a set of torsion springs or as a damper shim.

Freewheel device 12 includes an inner ring component 31 and an outer ring component 32, between which a plurality of clamping bodies 33 are situated. Inner ring component 31 has an outer running surface and outer ring component 32 has an inner running surface, on which clamping bodies 33 rest. At least one of the raceways is implemented as a clamping raceway. In the illustrated example, clamping bodies 33 are designed as clamping rolls. Inner ring component 31 has a fixing flange 34, molded on as a single piece, which is connected directly to damper secondary side 16. In this way, built-in module 13 results in a very compact structural unit. Freewheel device 12 furthermore includes a receptacle 35 for input shaft 20, which is rotatably fixedly connected directly to outer ring component 32.

LIST OF REFERENCE NUMERALS 1 drive system
2 vehicle
3 wheels
4 internal combustion engine
5 first drive interface
6 electric motor
7 second drive interface
8 transmission section
9 output interface
10 output area
11 damper device
12 freewheel device
13 built-in module
14 crankshaft
15 damper primary side
16 damper secondary side
17 damper section
18 freewheel input
19 freewheel output
20 input shaft
21 output shaft
22a first gear stage
22b second gear stage
22c third gear stage
23a, b, c drive wheels
24a, b, c output wheels
25a, b, c, d coupling devices
26 control device
27 electric motor drive wheel
31 inner ring component
32 outer ring component
33 clamping body
34 fixing flange
35 receptacle
H rotation axis

What is claimed is:

1. A drive system for a vehicle, the drive system comprising:
a damper device, the damper device having a damper primary side and a damper secondary side, the damper primary side forming a first drive interface for coupling a crankshaft of an internal combustion engine;
a freewheel device, the freewheel device having a freewheel input and a freewheel output, the damper secondary side being rotatably fixedly connected to the freewheel input;
a transmission section, the transmission section being operatively connected to the freewheel output;
an output interface for coupling an output section of the vehicle, the output interface being operatively connected to the transmission section; and
a second drive interface for coupling an electric motor, the second drive interface being operatively connected to the transmission section, the drive system being switchable by a control device to different operating states, so that a driving torque is conducted or conductible from the first drive interface or from the second drive interface to the output interface as a function of the operating state, the transmission section including an input shaft and an output shaft situated in parallel to each other, the transmission section including an electric motor drive wheel rotatably fixedly coupled with the second drive interface and a first drive wheel of a first gear stage meshing with the electric motor drive wheel, the first drive wheel being an idler wheel rotatably coupled with the input shaft via a selective coupling device,
wherein the freewheel device is designed as a clamping body freewheel device, the clamping body freewheel device including an inner ring component and an outer ring component as well as a plurality of clamping bodies, the clamping bodies being situated between the inner and outer ring components
wherein the inner ring component is fastened to the damper secondary side.

2. The drive system as recited in claim 1 wherein the freewheel device is designed as an overrunning clutch.

3. The drive system as recited in claim 1 wherein the damper device and freewheel device form a shared built-in module.

4. The drive system as recited in claim 1 wherein the control device is designed to activate a transition of the drive system, the internal combustion engine and the electric motor from a first operating state, only one drive torque from the second drive interface being present at the output interface, to a second operating state, only one driving torque from the first drive interface being present at the output interface, so that, during the transition, the freewheel device is transferred from a freewheel mode to a coupled mode by increasing the input rotational speed at the damper device.

5. The drive system as recited in claim 4 wherein, during the transition, the freewheel output is connected to the output interface via a form-fitting geared path.

6. The drive system as recited in claim 1 wherein the input shaft and the output shaft are selectively operatively connectable or operatively connected via the first gear stage and via at least one second gear stage.

7. A vehicle comprising the drive system as recited in claim 1.

8. A drive system for a vehicle, the drive system comprising:
- a damper device, the damper device having a damper primary side and a damper secondary side, the damper primary side forming a first drive interface for coupling a crankshaft of an internal combustion engine;
- a freewheel device, the freewheel device having a freewheel input and a freewheel output, the damper secondary side being rotatably fixedly connected to the freewheel input;
- a transmission section, the transmission section being operatively connected to the freewheel output;
- an output interface for coupling an output section of the vehicle, the output interface being operatively connected to the transmission section; and
- a second drive interface for coupling an electric motor, the second drive interface being operatively connected to the transmission section, the drive system being switchable by the control device to different operating states, so that a driving torque is conducted or conductible from the first drive interface or from the second drive interface to the output interface as a function of the operating state,
- the freewheel device being designed as a clamping body freewheel device, the clamping body freewheel device including an inner ring component and an outer ring component as well as a plurality of clamping bodies, the clamping bodies being situated between the inner and outer ring components, the outer ring component defining a receptacle for receiving and rotatably fixedly connected to an input shaft of the transmission section.

9. The drive system as recited in claim 8 wherein the inner ring component is formed as a single piece with a fixing flange, the fixing flange being connected directly to the damper secondary side.

* * * * *